United States Patent
Gimenez

(10) Patent No.: US 8,245,306 B2
(45) Date of Patent: Aug. 14, 2012

(54) DIGITAL RIGHTS MANAGEMENT PRINTING SYSTEM

(76) Inventor: Galo Gimenez, Barcelona (ES)

( * ) Notice: Subject to any disclaimer, the term of this patent is extended or adjusted under 35 U.S.C. 154(b) by 2384 days.

(21) Appl. No.: 10/367,657

(22) Filed: Feb. 14, 2003

(65) Prior Publication Data

US 2003/0182475 A1    Sep. 25, 2003

(30) Foreign Application Priority Data

Feb. 15, 2002 (GB) .................................. 0203627.5
Jul. 29, 2002 (GB) .................................. 0217474.6

(51) Int. Cl.
*G06F 17/30* (2006.01)
*G06F 21/00* (2006.01)
*G06F 7/04* (2006.01)

(52) U.S. Cl. ................ 726/27; 726/31; 380/51; 380/55; 705/51; 705/54; 705/57; 705/59

(58) Field of Classification Search .................... 726/27, 726/31; 380/51, 55; 705/51, 54, 57, 59
See application file for complete search history.

(56) References Cited

U.S. PATENT DOCUMENTS

| | | | | |
|---|---|---|---|---|
| 5,532,920 | A | | 7/1996 | Hartrick et al. ............ 364/419.1 |
| 5,629,980 | A | * | 5/1997 | Stefik et al. ..................... 705/54 |
| 5,958,005 | A | | 9/1999 | Thorne et al. .................. 709/202 |
| 6,314,409 | B2 | * | 11/2001 | Schneck et al. .................. 705/54 |
| 6,378,070 | B1 | * | 4/2002 | Chan et al. ..................... 713/155 |
| 6,449,721 | B1 | * | 9/2002 | Pensak et al. ................... 713/171 |
| 6,560,639 | B1 | * | 5/2003 | Dan et al. ...................... 709/218 |
| 6,711,677 | B1 | * | 3/2004 | Wiegley ........................ 713/151 |
| 6,763,464 | B2 | * | 7/2004 | Wang et al. .................... 713/193 |
| 6,785,812 | B1 | * | 8/2004 | Botham et al. ................. 713/168 |
| 6,826,609 | B1 | * | 11/2004 | Smith et al. .................... 709/225 |
| 6,862,583 | B1 | * | 3/2005 | Mazzagatte et al. ............ 705/64 |
| 6,925,498 | B2 | * | 8/2005 | Kujirai .......................... 709/225 |
| 7,003,667 | B1 | * | 2/2006 | Slick et al. ..................... 713/182 |
| 2001/0021926 | A1 | | 9/2001 | Schneck et al. ................. 705/54 |
| 2001/0042045 | A1 | * | 11/2001 | Howard et al. ................. 705/51 |
| 2001/0049666 | A1 | | 12/2001 | Prakken et al. ................. 705/59 |
| 2002/0002688 | A1 | | 1/2002 | Gregg et al. ................... 713/202 |
| 2002/0007456 | A1 | * | 1/2002 | Peinado et al. ................ 713/164 |
| 2002/0042884 | A1 | * | 4/2002 | Wu et al. ....................... 713/201 |
| 2002/0048369 | A1 | * | 4/2002 | Ginter et al. ................... 380/277 |
| 2003/0014640 | A1 | * | 1/2003 | Loyd ............................. 713/182 |

(Continued)

FOREIGN PATENT DOCUMENTS

EP    0 567 800 A1    11/1993

(Continued)

OTHER PUBLICATIONS

Menezes, Alfred J. et al. Handbook of Applied Cryptography, 1997 CRC Press, pp. 425-429, 547-550 & 581-583.*

(Continued)

*Primary Examiner* — Michael Simitoski

(57) ABSTRACT

A print management system for production of printed documents, said system comprising a policy editor component capable of receiving a document file, and applying a level of protection to said document file to produce a protected document file a policy enforcement component, operable for enforcing a document management policy for said protected document file; and at least one printer device, said printer device operable to receive said protected document file, refer to said policy enforcement component, and in response to an authorization signal received from said policy enforcement component, to print at least one printed document.

5 Claims, 13 Drawing Sheets

U.S. PATENT DOCUMENTS

2003/0079134 A1* 4/2003 Manchala et al. ............ 713/182
2003/0105963 A1* 6/2003 Slick et al. .................... 713/171

FOREIGN PATENT DOCUMENTS

| EP | 0 715 245 A | 6/1996 |
| EP | 0 715 245 A1 | 6/1996 |
| EP | 1 152 317 A | 11/2001 |
| EP | 1 152 317 A1 | 11/2001 |
| WO | 97/14087 | 4/1997 |
| WO | 01/52113 A1 | 7/2001 |
| WO | 02/03189 A1 | 1/2002 |

OTHER PUBLICATIONS

Microsoft. Microsoft Press Computer Dictionary, 3rd Edition, 1997 Microsoft Corporation, p. 215.*

Stallings, William. Network Security Essentials: Applications and Standards, 2000 Prentice-Hall, Inc., pp. 203-223.*

Butler, S. et al. "RFC 2910—Internet Printing Protocol/1.1: Encoding and Transport", Sep. 2000.*

Kugler, Carl et al. "Internet Printing Protocol (IPP) Encoding and Transport", Dec. 1998.*

Wright, F. D. "Requirements and Design Goals for an Internet Printing Protocol", Dec. 1998.*

Menezes, Alfred J. et al. Handbook of Applied Cryptography, 1997 CRC Press, pp. 283-287.*

Kaplan, M., "IBM Cryptologies, SuperDistribution and Digital Rights Management", retrieved from http://www.research.ibm.com/peop...plan/cryptolope-docs.crypap.html (Dec. 30, 1996).

* cited by examiner

DIGITAL RIGHTS MANAGEMENT PRINTING SYSTEM

FIELD OF THE INVENTION

The present invention relates particularly, although not exclusively to system for management of rights in digital data, a method and apparatus for enforcing management policies applicable to document content.

BACKGROUND OF THE INVENTION

With the advent of the internet, large amounts of image content and text content are available from a large number of websites on the world wide web. Additionally, with the advent of e-services, text and image content is being increasingly made available in electronic format for local printing, as a paid for service. However, image data and text data in electronic format can be relatively easily duplicated without destroying or detracting from the original data, and misappropriation of text or image data in electronic format is difficult to detect or verify.

Whilst copyright laws apply in many territories, such laws do not provide an efficient or cost effective remedy for misappropriation of electronic data. In particular, misappropriation of electronic data may go undetected, and the scale of copying may potentially be unlimited and involve a large number of persons duplicating the data. Legal costs are in many cases prohibitive. Further, for some types of content, for example old master paintings where the copyright term has expired, there is no legal protection for the content, and there is no legal barrier to persons coping those documents. Some content owners, for example the National Gallery in London, which has material whose copyright is expired, but nevertheless is of high value requires total security for their content, and control very carefully any reproduction of valuable paintings, drawings or sketches, whether these are subject to copyright protection or not.

In general, for various reasons, content owners may wish to limit and control the reproduction of their text and image content by technical means, in addition to any legal rights which may subsist in such content.

Prior art systems for managing permissions and rights in digital content are available, for example the prior art e-Trust, and TryMedia systems available on the internet. However, all these prior art systems rely on an application program installed on a client computer, receiving a content which enforces file management policies and file security at a receiving client computer. None of the prior art systems provide enforcement policies for printing of documents, which carry through to the actual printing stage.

The prior art systems lose control of document content before the document content is printed on a printer device. Consequently the prior art systems cannot ensure end to end policy enforcement for valuable electronic content.

SUMMARY OF THE INVENTION

Specific implementations of the present invention aim to provide a trustable system which enables content owners to publish their documents in an online environment with the knowledge that the printed format and other parameters of those document can be controlled at the printing stage by remote printing devices, such as those operated by third party print service providers.

Specific implementations according to the present invention aim to provide content owners with a set of technically enforceable rules for usage of document content, which allows content owners to make publicly available a document content, whilst applying technical restrictions on usage of content data made available online. In various implementations, a content owner is able to specify a set of rules for handling of content data, which apply at point of printing, which is the last point of control in an online publishing workflow.

In specific implementations according to the present invention, a content owner can apply a set of policies to a job file containing a content data, wherein the policies are enforceable at a terminal device in a workflow chain, in particular a printer device which converts the content data into printed product.

According to a first aspect of the present invention there is provided a print management system for production of printed documents, said system comprising:

a policy editor component capable of receiving a document file, and applying a level of protection to said document file to produce a protected document file;

a policy enforcement component, operable for enforcing a document management policy for said protected document file; and at least one printer device, said printer device operable to receive said protected document file, refer to said policy enforcement component, and in response to an authorisation signal received from said policy enforcement component, to print at least one printed document.

According to a second aspect of the present invention there is provided a system for management of rights in digital data, said system comprising:

a policy creation entity for applying a document management policy to at least one document, said policy, comprising conditions on usage of a said document;

a policy enforcement entity for enforcement of a said document management policy applied to a said document; and a document printing facility for printing documents in compliance with said document management policy.

According to a third aspect of the present invention there is provided a document management entity comprising:

at least one server computer comprising:
a data processor;
a data storage device;
at least one communications port; and
a web-server interface, said web-server interface being remotely accessible, and operable for applying to a document file management data describing a set of permissions applicable to a document file; and
an encryption component for encrypting said document file and said file management data.

According to a fourth aspect of the present invention there is provided a policy enforcement entity comprising:

a server computer comprising at least one data processor, at least one data storage device, at least one communications port and a policy enforcement component;

said policy enforcement component operable to:
receive a document file over a secure communications link;
receive data identifying a source of said document file;
receive data identifying a set of policies for printing of documents from said document file; and
store said data describing said document handling policy in said data storage device.

According to a fifth aspect of the present invention there is provided a printer device capable of carrying out secure printing of documents, according to a predetermined document handling policy, said printer device comprising:

a print mechanism for printing a plurality of documents; and a verification component for verifying a set of document policies applied to said documents.

According to a sixth aspect of the present invention there is provided a method for secure management of content data in an on-line environment, said method comprising:

applying a job description data to said content data, said job description data identifying a set of printing criteria for printing said content data;

applying a verification data to said content data, said verification data verifying a source of said printing criteria;

encrypting said content data and said printing criteria data to produce an encrypted protected document;

receiving said encrypted protected document at a printer device;

said printer device decrypting said protected document using a locally stored key data;

said printer device reading said verification data and sending said verification data to a policy enforcement device;

said printer reading said printing criteria;

said printer verifying a source of said protected document with said policy enforcement entity; and said printer printing a said document in compliance with said document printing criteria.

According to a seventh aspect of the present invention there is provided a method for secure management of content data in an on-line environment said method comprising:

applying a job description data to said content data, said job description data identifying a set of printing criteria for printing said content data;

applying a verification data to said content data, said verification data verifying a source of said printing criteria; and encrypting said data content and said job description data.

According to an eighth aspect of the present invention there is provided a method of operating a policy enforcement entity, said policy enforcement entity comprising a policy enforcement component, said method comprising:

receiving a document file over a secure communications link;

receiving data identifying a source of said document files;

receiving data identifying a set of policies for printing of at least one document from said document file;

in response to a received request for verification of a document, comparing said verification request with said received document file; and confirming said set of policies for printing of at least one document from said document file.

According to an ninth aspect of the present invention there is provided a method of applying a policy data to a document file, said method comprising:

receiving a document file containing a content data;

creating a job description file, said job description file containing a set of conditions applicable to said document file; and encrypting said job description file and said document file.

Other aspects of the invention areas recited in the claims herein

According to a tenth aspect of the present invention there is provided a computer program comprising program instructions for causing a computer to perform the processes of:

applying a job description data to a content data, said job description data identifying a set of printing criteria for printing said content data;

applying a verification data to said content data, said verification data verifying a source of said printing criteria;

encrypting said content data and a printing criteria data produce an encrypted protected document;

receiving said encrypted protected document at a printer device;

said printer device decrypting said protected document using a locally stored key data;

said printer device reading said verification data and sending said verification data to a policy enforcement device;

said printer reading said printing criteria;

said printer verifying a source of said protected document with said policy enforcement entity; and said printer printing a said document in compliance with said document printing criteria.

According to an eleventh aspect of the present invention there is provided a computer program comprising program instructions for causing a computer to perform the processes of;

applying a job description data to a content data, said job description data identifying a set of printing criteria for printing said content data;

applying a verification data to said content data, said verification data verifying a source of said printing criteria; and encrypting said data content data and said job description data.

According to a twelfth aspect of the present invention there is provided A computer program comprising program instructions for causing a computer to perform the processes of;

receiving a document file over a secure communications link;

receiving data identifying a source of said document file;

receiving data identifying a set of policies for printing of at least one document from said document file;

in response to a received request for verification of a document, comparing said verification request with said received document file; and confirming said set of policies for printing of at least one document from said document file.

According to a thirteenth aspect of the present invention there is provided a computer program comprising program instructions for causing a computer to perform the processes of;

receiving a document file containing a content data;

creating a job description file, said job description file containing a set of conditions applicable to said document file; and encrypting said job description file and said document file.

According to a fourteenth aspect of the present invention there is provided a computer program comprising instructions for secure management of content data, said instructions operable for causing at least one computer entity to:

apply a job description data to said content data, said job description data identifying a set of printing criteria for printing said content data;

apply a verification data to said content data, said verification data verifying a source of said printing criteria;

encrypt said content data and said job description data produce an encrypted protected document;

receive said encrypted protected document at a printer device;

said instructions further operable for:

causing said printer device to decrypt said protected document using a locally stored key data;

causing said printer device to read said verification data and send said verification data to a policy enforcement device, causing said printer to read said printing criteria;

causing said printer to verify a source of said protected document with said policy enforcement entity; and causing said printer to print a said document in compliance with said document printing criteria.

According to a fifthteen aspect of the present invention there is provided a computer program comprising program instructions for secure management of content data, said instructions being operable for causing at least one computer entity to:

apply a job description data to said content data, said job description data identifying a set of printing criteria for printing said content data;

apply a verification data to said content data, said verification data verifying a source of said printing criteria; and encrypt said data content and said job description data.

According to a sixteenth aspect of the present invention there is provided a copy of a computer program comprising program instructions for operating a policy enforcement entity, said policy enforcement entity comprising a policy enforcement component, said instructions operable for causing said policy enforcement entity to:

receive a document file over a secure communications link;

receive data identifying a source of said document files;

receive data identifying a set of policies for printing of at least one document from said document file;

in response to a received request for verification of a document, compare said verification request with said received document file; and confirm said set of policies for printing of at least one document from said document file.

According a seventeenth aspect of the present invention there is provided a computer program comprising program instructions for applying a policy data to a document file, said instructions operable for causing at least one computer entity to:

receive a document file containing a content data;

create a job description file, said job description file containing a set of conditions applicable to said document file; and encrypt said job description file and said document file.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF A SPECIFIC MODE FOR CARRYING OUT THE INVENTION

Figure 1:
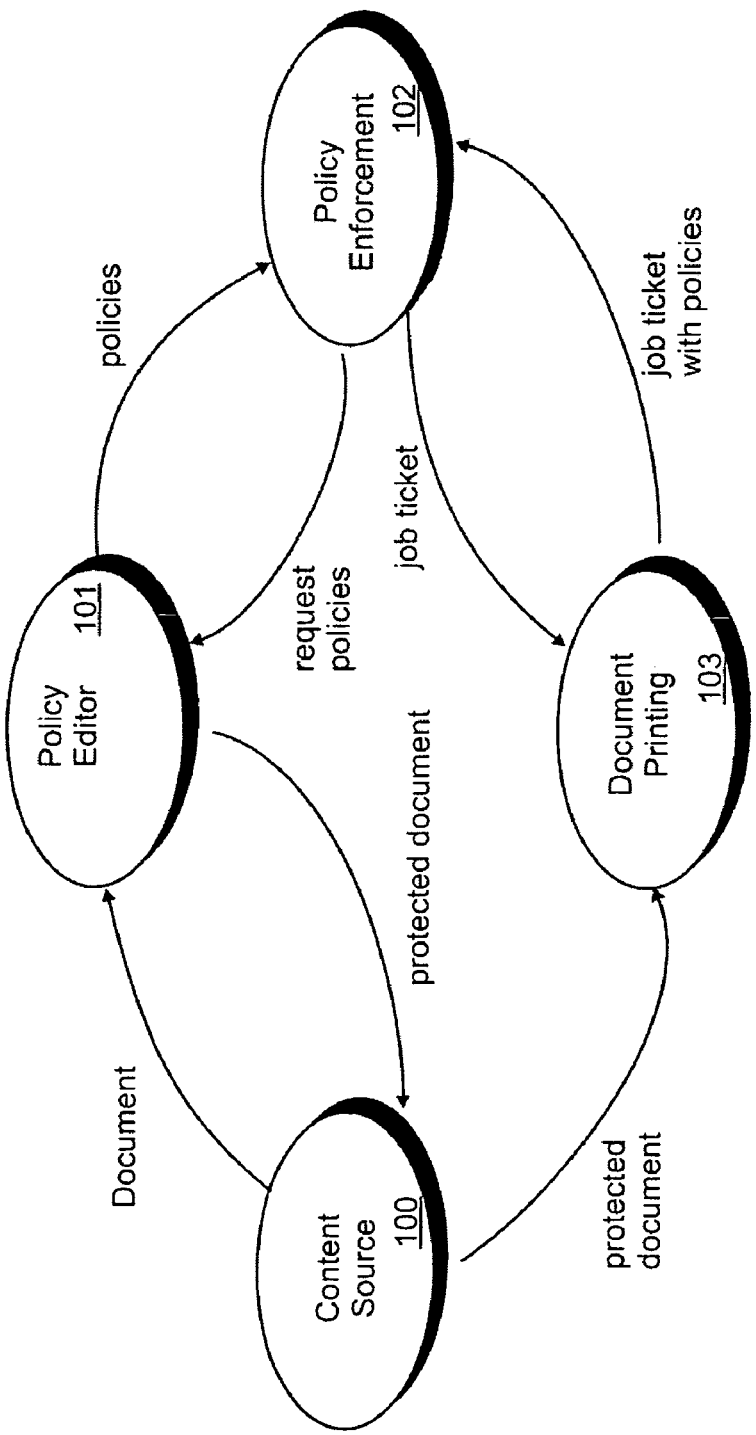
FIG. 1 illustrates schematically a first system for management rights in digital data according to a first specific implementation of the present invention.

There will now be described by way of example a specific mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

An online scenario may comprise the following components:

a document owner or an author;

a policy editor;

a policy enforcement authority;

one or more printers.

In overview, operation of the system is as follows:

The content owner uploads a document to be protected over a secure link to the policy editor, and applies policies for management of the document, using the policy editor.

The policy editor returns a protected document to the content owner which is encrypted, and encapsulated in a MIME package.

The content owner selects a printer, and sends the protected document over a communications channel which can be secure or non secure, at the content owners options, and the protected document is received by the printer.

Alternatively, the content owner can send the protected document to another destination, for example posting the document to a web site, where it can be collected and directed to a printer entity.

The printer unwraps the MIME package to strip off a job ticket, and sends this over a secure channel to a policy enforcement authority. The policy enforcement authority decrypts the job ticket, extracting a key for use in decrypting the protection document. The key is sent back to the printer device over a secure channel, enabling the printer device to decrypt the protected document. The same key, or a different key contained in the job ticket can also be sent back from the policy enforcement authority to the printer device to decrypt the job ticket, thereby enabling the printer to read the document and policies contained in the job ticket.

The printer device then prints the document according to the document printing policies contained in the job ticket.

In a variation of the above basic operation, instead of policy data being contained in the job ticket, the policy enforcement authority can store or obtain policy data which can be dynamically updated by the content owner, and upon receipt of a job ticket containing a pointer to that policy data, send the policy data over the secure channel to the printer device from which it received the job ticket, so that the printer device obtains the policy data not from the job ticket itself, but from the police enforcement authority. The policy enforcement authority can either store the policy data itself, or can obtain it from elsewhere, in particular form the policy editor.

The aforementioned basic overview of operation can have many variations on implementation. Further detail of operation of a best mode implementation now follows;

In a best mode implementation of a digital rights management system according to one embodiment of the present invention, where a document owner or author (herein after referred to as a content owner) wishes to make a data content such as a picture available, and yet still to have control over what actually happens to it, this is handled as follows:

The content owner uses a policy editor entity, in the form of a web application, to add policies to a document. In this example, a policy editor can be a company, for example one called SecureDoc.com. The role of the policy editor entity is firstly to maintain policies, and secondly to edit policies. The content owner can upload his document (for example a document denoted my picture.jpg) to the policy editor application, and using a set of tools provided by the application, create a set of rules or policies which the content owner wishes to enforce in relation to that document.

The content owner receives back from the policy editor application a secure document. The received document is in a secure form, for example (my picture.psd), where the .psd file extension is an extension created to describe protected secure documents. The content owner can then publish his document on an art gallery website or other website, or he can just send the document bye-mail to a print shop to obtain a hard copy of the document.

The art gallery website may send the document to a print shop. The print shop sends the document as an electronic file to a printer or to a printer front end, such as a raster image processor (RIP) which supports secure documents. When the printer or the printer front ends receives the documents, it then applies a set of rules defined for management of that document. The rules are contained in a document job ticket, which is appended to the document.

The content owner does not necessarily need to select a printer at the point of adding the rights to the document at the policy editor. The content owner does not have to select a printer at all, since this is not part of any policy which must be specified by the content owner to be enforced.

A content owner may select a printer as follows. A content owner can create a protected document to be printed by any printer in a system. However, if the content owner wishes to print the document at a particular specified printer, the content owner can access a list of printers in the system, which can be viewed at the policy editor entity. Viewing may be carried out by viewing a directory printers stored at the policy editor entity. For example the directory may contain a list of names of owners of print shops, and for that print shop, a list of printers resident with or assigned to that print shop. The content owner can select from the list an individual printer or printers for printing of the document. The functionality to do this is provided at the policy editor entity in an application program. Printers are registered with one or more policy enforcement entities which maintains a directory of addresses or registered printers. A directory of registered printers may alternatively be contained in a publicly accessible directory, which can be queried, in order to obtain the addresses of the registered printers.

One way to make a printer or a printer front end apply the policies is via a policy enforcement authority. There are several reasons for this, including the following:

The printer should optimally be as simple as possible. However, the printer does have functionality to be able to strip off a job ticket and send this to an external service. All complex policy enforcement logic should optimally reside outside the printer.

The printer may be static in its configuration. New rules might need new logic to be implemented in a policy enforcement authority. The printer itself is not affected by policy changes applied at the policy enforcement authority.

The policy enforcement authority provides a single point of control to which all printers refer. The policy enforcement authority is therefore optimally placed to implement a decryption of documents.

Applying a rule or a policy may require that contact with a policy enforcement database is achieved. This can be done by the policy enforcement authority, which simplifies printer logic, and guards against possible encryption attacks.

The printer device sends the job ticket to the policy enforcement authority. The job ticket contains a policy description. The policy enforcement authority reviews the job ticket, and determines immediately the rules relating to the document identified in the job ticket. Some of the rules may require that the policy enforcement authority contacts a policy enforcement database or some other service, for example a merchant service. This means that some rules might be explicitly described on the job ticket, for example maximum resolution of print. Other rules might be defined somewhere else, for example in a policy editor database, so that they can be changed over the life of a document by an author. Policies which may be changed over the life of a document include for example changing a watermark, or a text to be printed from a document.

The policy enforcement authority sends back a second job ticket to the printer. The second job ticket has the rules applied to it. The second job ticket does not contain any policies, but is a plain job definition format (JDF) job ticket which defines a set of processes which apply to a print job.

The printer now has the document, and a new job definition format ticket, and can proceed to print the document.

Referring to FIG. 1 herein, there is illustrated schematically as a set of logical entities, a system for management of rights in digital data according to a first specific implementation of the present invention. The system comprises a content source 100, such as a data base of posters or images or other content, owned by a content owner such as a document owner or an author; a policy editor entity 101 for applying a document printing policy, comprising restrictions and conditions on usage of a content of a document; a policy enforcement entity 102 for enforcement of printing policies and conditions applied to a content data; and a document printing facility 103 for printing documents in compliance with a specified printing policy.

Content source 100 supplies a document file containing data content to policy editor entity 101 which applies a set of printing policies to the document. Communication between the content source and the policy editor entity 101 is by a secure transmission channel, for example over the internet, using the known secure socket layer (SSL) technology. The policy editor entity may be operated by an independent trusted service provider, and provide a service to a plurality of content owners operating one or more content sources. Policy editor entity 101 enables a content owner to create rules for document handling, and apply those to the document file, as a job ticket. The document file and job ticket together comprise a protected document. The user sends a document to the policy editor in order for the document to be protected. The policy editor protects the document and sends it back to the user in protected from. The user is then free to send the protected document over a non secure channel to any recipient.

Release of protected documents by the content source 100 may be made over non-secure transmission media, for example the internet, since the policy enforcement entity applies encryption and a digital signature to the protected document. If the encrypted and signed protected document becomes misappropriated over the non-secure transmission media, then the content remains protected by the applied encryption. The protected document can be released by an author to anybody. Encryption and policy enforcement gives confidence that the document will not be used fraudulently.

Whenever a printing entity 103 receives a protected document, the printing device refers to the policy enforcement entity 102 to notify the policy enforcement entity about the actions which the printing entity wishes to take. The printing entity obtains policy information specifying how the document is to be printed and any restrictions or conditions concerning printing of the document from the policy enforcement entity. In one specific method of operation, the printing entity has already received any conditions for printing the document contained in the job ticket, but is unable to decrypt the job ticket or the document without the assistance of the policy enforcement entity. The printing entity sends the encrypted job ticket to the policy enforcement entity for decryption, and the policy enforcement entity applies decryption to the job ticket and sends the decrypted job ticket back to the printing entity. The policy enforcement entity also controls the decryption key which the printing device needs in order to decrypt the document. Several encryption schemes can be used as described later herein.

Once the printing entity receives the decrypted job ticket, it can apply the print criteria and fulfil the print job. In another specific method of operation, the job ticket received by the printing entity, which is encrypted, does not contain the conditions attaching to printing of the document content, but rather contains a pointer which is used by the policy enforcement entity to identify a set of pre-stored conditions which the policy enforcement entity either stores locally, or has access to. The policy enforcement entity decrypts the job ticket, identifies the set of print criteria and conditions, sends authorization to the printing entity to print and sends the print criteria in decrypted format to a printing entity.

The policy enforcement entity maintains control of the conditions for printing the documents by virtue of maintaining control over the decryption of the job ticket. Additionally the policy enforcement entity controls the decryption of the document itself, by virtue of controlling access to the decryption key for decrypting the document, the decryption key being contained in the job ticket.

The role of the policy enforcement entity is to enforce application of the printing polices to the printers. Once the policy enforcement entity 102 has received a protected document, the policy enforcement entity will release a decrypted job ticket and policies to a specified document printing service 103.

Encryption of the document is applied up to and including the point at which decryption is applied at the printer, so as to protect against mis-appropriation of unencrypted content documents, and to ensure that only authorized printers can print documents, and in accordance with policies specified by the content source.

In the best mode implementation, the policy enforcement entity 102 may be operated by an independent policy enforcement agency, as a service provided to a content owner. However, in other implementations the policy editor function and the policy enforcement function may be carried out in a same application running on a same server computer platform.

A simple arrangement comprises a content source, a printer and one other entity which both protects documents as a service to the content source, and also carries out the enforcement function. The functionality for providing the service of document protection and the functionality for providing the service of policy enforcement may be provided on a same computing platform, and may be provided in the form of an application program loaded onto a server computing platform.

The individual entities illustrated logically in FIG. 1 are capable of a wide range of different physical and practical implementations. In FIG. 1, there is shown one example of a content source, policy editor entity, policy enforcement entity, and printing facility. However, in the general case there may be a plurality of content sources operated by a plurality of content owners, a plurality of policy editor entities, operated by one or more policy editor service providers, at least one policy enforcement authority, and a plurality of printing facilities. In the general case, the logical functions can be carried out on separate physical platforms or on common physical platforms, and responsibility for operation of the logical functions can reside with one legal entity or person or a plurality of legal entities or persons.

The policy editor entities and policy enforcement entity may be operated by a same trusted service provider as an on-line service.

Policy enforcement entity 102 may communicate with policy editor entity 101 by requesting polices stored on the policy editor, and receiving policy data downloaded from the policy editor entity 101. In cases where policy data is not contained within the job ticket sent to the document printing entity 103, the job ticket may contain a pointer to a location within the policy editor where the relevant document policies may be obtained. The policy enforcement entity 102 can obtain those policies from the policy editor entity 101, once it has received the pointer location which is contained in the job ticket which is received from the document printing entity 103.

Figure 2:
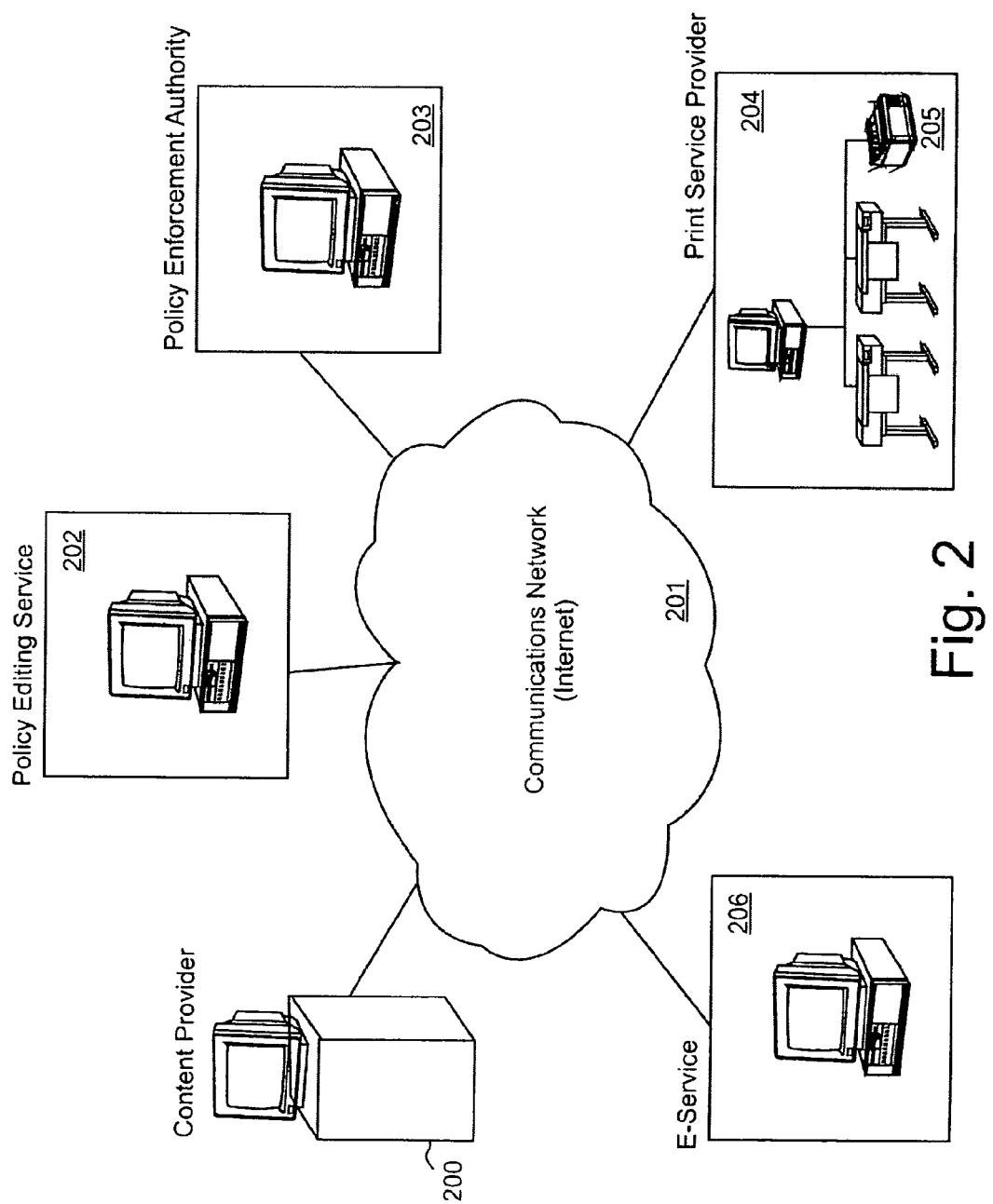
FIG. 2 illustrates schematically components for implementing a document management-system according to the first specific implementation of the present invention.

Referring to FIG. 2 herein, there is illustrated schematically components for implementing the document management system as illustrated in FIG. 1 herein, according to a specific implementation of the present invention.

The rights management system comprises a content provider computer 200 having a data processor, memory, prior art operating system, a user interface including monitor, keyboard, mouse or other pointing device, communications interface, for example USB Port and/or modem or equivalent communications interface, and a data storage device for storing a plurality of content data files; a policy editor computer 202, comprising a data processor, memory, video monitor, data entry device for example keyboard and pointing device, a prior art operating system and communications ports, and a web-server application providing policy editing functionality to one or more content provider computers; a communications network 201, for example a wide area network, virtual private network, or the internet; a policy enforcement computer 203 comprising data processor, memory, video monitor, data entry device e.g. keyboard, pointing device, and communications ports, and prior art operating system, the policy enforcement computer operating a policy enforcement application; a print service provider 204, the print service provider comprising at least one printer device 205, said printer device having a printer mechanism for printing documents, and a print verification component, capable of communicating with policy enforcement computer 203 to verify print polices and conditions for printing received documents.

Both the policy editor computer 202, and the policy enforcement computer 203 comprise trusted servers, operated by a trusted organization and, ideally, certified by a superior trusted organization such as Verisign®. The policy editor computer and policy enforcement computer may be operated by a same trusted organization, or may be operated by different trusted organizations. Ideally, the policy enforcement computer and policy editor computer are not only trusted, but are certified by a superior trusted organisation such as Verisign®. Where the policy editor computer and policy enforcement computer are operated by different trusted organizations, an organization operating the policy editor computer provides a service to one or more content owners, and the organization operating the policy enforcement computer provides the service to one or more organizations operating the policy editing computers. Communication between the policy editing computer(s) and the policy enforcement computer(s) is by secure transmission media, for example secure socket layer (SSL). Communication between the policy enforcement computer and one or more print service providers 204 is also by a secure communications link, such as SSL.

The task of the policy editor is to create a protected document with job ticket which contains rules for printing a document. A user uploads a document to the policy editor, and receives back a protected document which can be used in many different ways. For example to be posted on a web gallery, or sent by e-mail to other computers.

A printer which is registered in the system, such as 205, can obtain jobs from anywhere. Each printer device refers to a policy editor computer for receiving a job ticket and printing policy for documents to print, and for any other information concerning the printing of a document. For example the rules for printing the document may be contained not within a protected document itself, but the protected document points to a policy editor computer for obtaining a latest set of permissions and rules relating to a document.

Optionally, one or more e-service provider computers 206 may be referred to by the printer device 205, for providing services to the printer device enabling the printer device to comply with the policies and conditions set out by the policy enforcement computer 203. The e-service computer comprises a data processor, memory, data storage device, user interface including video monitor, keyboard and pointing device, data storage device, communications interface, and operating system as well as an e-service application for providing the e-service.

Figure 3:
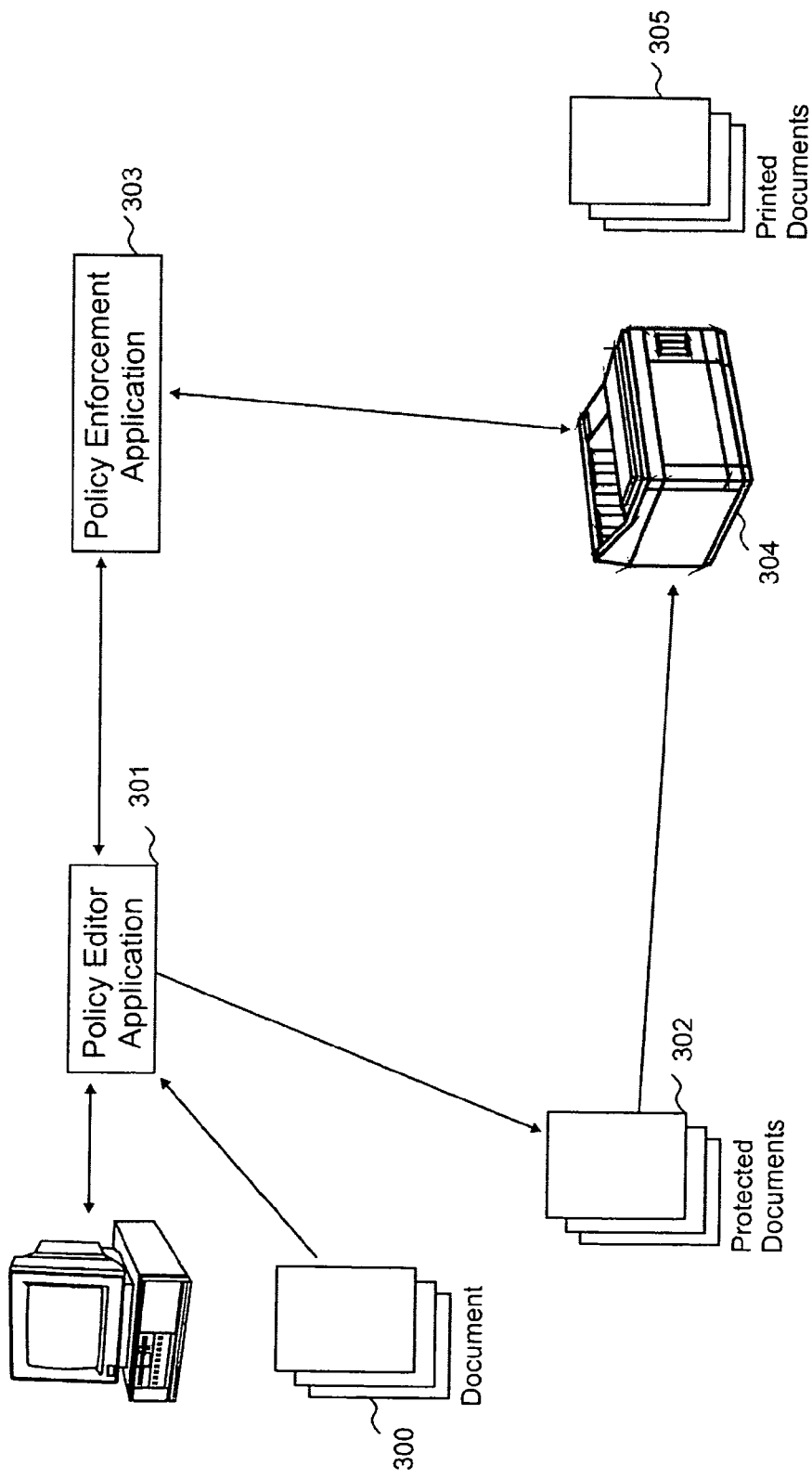
FIG. 3 illustrates schematically in overview a specific operation of the management system of FIG. 2.

Referring to FIG. 3 herein, there is illustrated schematically in overview, a specific operation of the print management system of FIG. 2. Components of the system include the following.

A document file 300 comprises content data which a content owner wishes to make available for printing. The content may be for example a print of a fine art picture, a computer aided design (CAD) drawing, for example an engineering drawing or an architectural drawing, in a CAD package language or CAD package such as Autocad®, a bitmap image, or other text or image data in a suitable format such as PDF, JPEG or TIFF file.

A policy editor application 301. The policy editor application comprises a component for creating a protected document. The policy editor application enables a content owner to create rules applying to the document, for printing and handling of a document, and applying those to the document in the form of the protected document.

A protected document file 302. A protected document file results as an output from the policy editor application 301. The protected document file comprises the document file 300 having the content data, and a job ticket file, containing policy information, the job ticket and content data archived in a single protected package. The format of the protected document file may follow a prior art format, for example RFC 1991, or can be a proprietary file format. The job ticket may be constructed according to a job definition format (JDF) and may contain information about an author of the content data, the type of file which the document file is, and policy information specifying any restrictions placed on printing of the file, and/or particular formats and methods of printing a document containing the content. The protected document is protected by encryption for both the job ticket and the content document. The job ticket can contain a set of policies to be enforced, or can contain a pointer to a set of policies to be enforced.

A policy enforcement application 303. The policy enforcement application is operated by a policy enforcement authority, typically, but not essentially, being a separate legal entity to the content owner. The policy enforcement application operates to receive a protected document from policy editor application 301, record information about printing operations carried out on protected documents, provide or verify policy information concerning printing policies and conditions applied to individual protected documents. The policy enforcement application 303 has a pair of keys, that is a private key that only the policy enforcement application knows, and a public key.

In the system, generally there will be more than one policy enforcement application and policy enforcement entity, to make redundancy and reliability of the system, so if a policy enforcement application or policy enforcement entity to which a printer is registered with fails, documents can still be printed by those printers referring to an alternative policy enforcement application or entity, typically operated by a separate policy enforcement authority to the first policy enforcement application. Each policy enforcement application stores the public keys of all printer devices within the system. Various key systems and methods of handling keys can be used, and these are as described later herein.

Printer devices 304. A printer device comprises a printing mechanism, along with a printer verification component which executes printing policies and conditions contained in the protected document. The printing devices print printed documents according to the policies, specifications and restrictions specified in the job ticket of the protected document 302. Each printer device has a pair of public keys and a pair of private keys. The public key of the policy enforcement application is known by all the printer devices in the system, and stored inside firmware comprising the printer, or in firmware in a separate card installed in the printer.

The printer verification component can be supplied as a program code download to a printer device, or can be implemented as firmware in a printer device. The verification component operates to gain authorization from the policy enforcement entity whenever the printer receives a document to be printed, and to apply any criteria or restrictions on printing of the document, so that documents are printed only according to the policies specified by a person sending the document for print. The verification component sends a job ticket to the policy enforcement entity and receives back decrypted policy data to be applied to the document, and keys for decrypting the content document itself.

Printed documents 305. Printed documents 305 are the output of a printer device 304, and comprise content printed onto posters, sheets, or other print media in a format originally specified by the content owner using the policy editor application 301.

Users of the system include the following:

One or more content owners. The content owner is a legal and/or natural person, who controls the content. The content owner may have legal rights in the content, for example copyright, data protection right or similar rights, or be a person who practically controls access to the content and controls storage of the content data. For example, in the case of an old master painting for which copyright has expired, the content owner may be the legal owner of the painting itself, and may seek to control reproduction of the old master painting, by physical possession of the painting and restricting the access of persons photographing or copying the old master, and also restricting access to storage of content data, for example photographic content data captured from the painting itself.

One or more policy enforcement authorities. The policy enforcement authority may be an independent legal person, who is generally trusted by all users of the system. The enforcement authority may be a large corporation, for example a multi-national corporation having independently audited accounts, or may be a government funded body or an intra-governmental body formed according to international treaty. Typically the policy enforcement authority will have in place internal procedures for verifying employees and restricting access to the policy enforcement application responsible for creating protected documents.

One or more print service providers. The print service provider comprises a legal and/or natural person having control of the secure printing device, and entrusted with handling of the printed documents 305 by the content owner. The print service provider may operate a plurality of printer devices 304 which execute printing policies contained in a protected document.

Protected documents may also be received by persons who are not print service providers, in which case, in order to print a document from the received protected document, the receiving person must use a printer device 304 having a print verification component, in order to effect the necessary decryption, and printing of a printed document in a format specified by a content owner.

Figure 4:
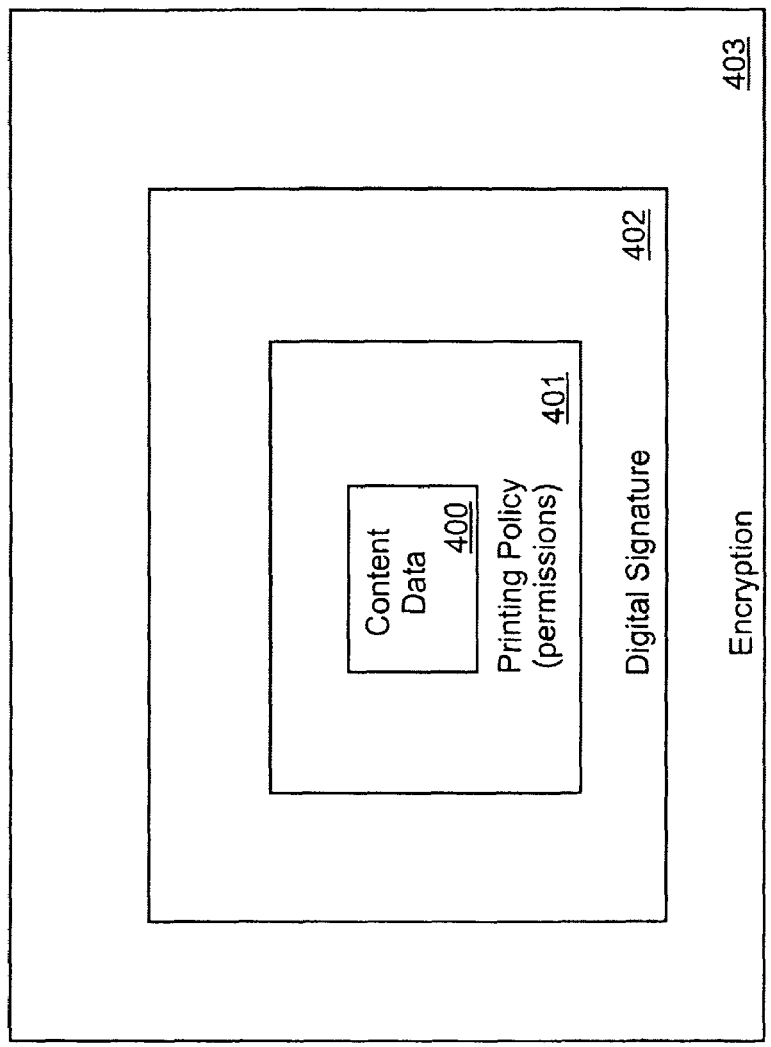
FIG. 4 illustrates schematically layers of protection applied to content data, in a protected document format according to a specific method of the present invention.

Referring to FIG. 4 herein, there is illustrated schematically a protected document file, showing different layers of protection applied to a content data. Content data 400 comprises any type of content data which is printable, including image data, bitmaps, computer aided design (CAD) files, text files, or other image data in PDF, JPEG or TIFF format. The content data 400 is protected by a job ticket data 401 comprising printing policy data. The job ticket also includes a key for decryption of the content data. The job ticket may be sent to a policy enforcement entity to obtain the policy data and the decryption key for decrypting the content data.

The document is not necessarily sent to a specific printer in a print shop according to a sender's preference, but the print service provider can direct the job to a suitable printer. As long as the printer is enabled by a verification component so that the printer can communicate with a policy enforcement entity, then there is a selection of printers which can be used. If the print job is sent to a printer not having a verification component, then that printer cannot print the content because it is encrypted and the printer does not have the decryption key. The decryption key must be obtained form the policy enforcement entity. The policy enforcement entity only sends decryption keys to printers having a verification component. The policy enforcement entity can obtain the key from an encrypted job ticket which it receives from an authorized printer in the system.

The printing policy data is not necessarily a fixed set of policies, and in principle any policy can be applied. However, in the best mode implementation, a number of controls and permissions may include the following:

copy permission data, which authorizes a predetermined number of copies which can be printed of that protected file;

a printer permission data, the printer permission data specifying an individual person and/or printer which is authorized to carry out the printer;

document author data describing an author of the document;

file type data, describing a file type of the content data, for example whether the file is PDF, JPEG, TIFF etc.;

printing control data, the printing control data comprising a plurality of data fields, selected from the set;

a print resolution field, containing print resolution data for specifying a resolution of document print;

a format data, the format data specifying a print media size, for example A4, A1, or the like, specifying a print media type, for example glossy paper or similar and specifying type fonts, margins, to be applied to the printed document;

a content data handling data, which defines what is to happen to the content data, once an authorised number of documents have been printed at the printer device, including flags to determine whether the content data should be overwritten at the printer device, or saved to a host computer device hosting the printer, in which case there may be a further flag defining whether the policy enforcement application is to be notified that the content data is being stored locally at the print facility.

The polices are described with an XML document, where there is included: a policy name; a set of policy preconditions specifying when the rules can be applied; a set of policy post conditions specifying what happens after the applying the rules; a policy breakup action specifying what happens if the policy isn't followed or cannot be applied. The policy enforcement application knows how to apply the rules, generating a job description format with the processors that will be used to print this document.

In some cases, the policy enforcement application will generate a job description file which forces the printer to remove the job from its memory. That is, the policy enforcement data may comprise instructions to purge or overwrite the document from the memory in the printer to avoid the risk of misappropriation of the decrypted document from the printers memory, once an authorized number of copies of the document have been printed by the printer. In this way, secure printing of an authorized or licensed number of print copies can be made remotely, and the decrypted document data destroyed at the printer after printing the licensed number of copies. In other cases, the job description file may ask for the job to be printed, but at a specified resolution, or it might ask the printer to add a watermark in the printed copy It will be appreciated that there are many possible variations of rules for document handling, which can be contained within the job ticket.

Security mechanisms used in the system areas follows.

There are several schemes which can be applied. The most common scheme is the known public key infrastructure (PKI) system which is based on symmetric keys. Using the known PKI infrastructure, a possible implementation would have keys which reside as follows:

1. Each printer has a pair of keys, that is a public key and private key. The private key is stored inside the printer. The public key is stored in the policy enforcement authority, which means that there is a database in that authority, containing a printer identification data, and public key pairs.

2. The policy enforcement authority has a further pair of keys. That is, a private key which is specific to the policy enforcement authority, and a public key. Every printer has a copy of the policy enforcement authority public key. The public key is also known by the policy editor.

3. Each policy editor has another pair of keys. That is, a private key known only by the policy editor and a public key. The policy enforcement authority knows the public key of the policy editor.

An asymmetric key based encryption is usually very costly for a large document, and so a hybrid encryption scheme can be used. In this scenario, encryption can occur as follows:

The policy editor encrypts the document itself using a symmetric key based algorithm, for example 3DES, or blowfish.

The key is stored as part of the job ticket.

The job ticket, which is much smaller, is encrypted using an asymmetric scheme. The job ticket is encrypted using the policy enforcement authority public key. Therefore only the policy enforcement or authority can decrypt the job ticket.

The encrypted job ticket and the encrypted document can be combined in a single document using a MIME multipart encoding. The known MIME encoding is a way of archiving different contents together.

A document received by the printer is unencoded, using MIME the job ticket is sent to the policy enforcement authority as explained before.

The printer sends the job ticket to the policy enforcement authority.

The policy enforcement authority can decrypt the job ticket, and extract the key used for the encryption of the documents itself. The key and the name of the symmetric algorithm are placed in the new job description file (JDF) job ticket and sent back to the printer.

The printer can decrypt the document using this algorithm, and the key provided, and apply the process specified in the job ticket to the document.

Communications between the policy enforcement authority and the printer are done using their private keys to sign the document and to encrypt the messages between them. This makes sure that the policy enforcement authority and the printer can communicate with each other correctly.

Also, all the communication is done using a secure communication channel such as secure socket layer (SSL).

A digital signature 402 allows for authentication of the source of the information.

The digital signature identifies several things. Firstly, the digital signature identifies a customer who originated a print job. Secondly, the digital signature identifies a policy editor application which has created the protected document. The digital signature originating with the content source is endorsed by the policy editor application. Several entities can sign the protected document, by endorsing a digital signature originally applied by the content source to the document. The signature applied by the content owner is endorsed by a higher certification authority for example Thwaite® or Verisign® or a similar trusted organization. The digital signature applied by the policy editor application is also certified by a certification authority. The certification authority may be the same as the policy enforcement authority, or may be different. The digital signature information can work in several ways.

Firstly, the printer device itself may store its own local digital signature, which the printer device users to verify itself to the policy enforcement application 303.

Secondly, the protected document itself may contain a digital signature, which verifies the source of the protected document to the printer device. Those content sources can be identified by a digital signature contained within a protected document issued by those content sources. That is, issued by individual policy editor applications of authorized content sources.

The content data is further protected by an encryption system 403. The protected document is encrypted, whenever it is transmitted on a non-secure link, for example between the policy editor application and a printer device. If the protected document becomes misappropriated, then only the encrypted document can be misappropriated and the encryption provides a barrier to access to the content data contained in the protected document. The applied encryption makes use of a prior art encryption system, for example, PGP, or similar. Each printer device stores a public key and a private key for communicating with one or more policy editor applications, and another public key and private key for communicating with one or more policy enforcement applications.

In the best mode implementation, communications through the content source and the policy editor are made over a secure channel, such as an SSL channel, although other alternatives are available. Conventional internet browsers support SSL communications. If an additional level of security is required, in which the content owner is identified as well as the policy editor entity, then additional certificate can be obtained, and a certified communication between the content source and the policy editor can take place in addition to the SSL communication. An additional layer of security may be provided by encryption of the document being sent from the content source to the policy editor.

For communications between the printer entity and the policy enforcement entity, after receiving the protected document, the printer extracts the job ticket from the MIME package and then establishes a communication with the policy enforcement entity, to send the job ticket to the policy enforcement entity. Since the printer stores the public key of the policy enforcement entity and the policy enforcement entity stores the public key of the printer entity, the communication between the printer entity and the policy enforcement entity, in the best mode is effected through secure channel using public key encryption. Additionally, this communication can be contained with a secure layer (SSL) channel, so there may be a plurality of layers of encryption for communications between the printer entity and the policy enforcement entity. All entities know which other entity they are communicating with, because of the public key scheme.

Communications between the policy editor and the policy enforcement entity, where they occur, can either be internally in a server, where the policy enforcement and policy editor entity are contained within a same physical device, or, where the policy editor entity is physically distinct and remote from the policy enforcement entity, communications may be made using public keys, so that the policy editor entity knows the public key of the policy enforcement entity and vise versa the policy enforcement entity stores the key of the policy editor entity. Subsequent communications are encrypted using the public keys. However, security systems may be deployed for these communications, as long as the channel between the policy editor entity and the policy enforcement entity is secure.

For communications between the content source and the printer entity, these are made over the internet, as the document is already protected by the policy editor entity before returning it to the content source entity. The content source entity can then release the protected document into an insecure environment such as the internet. However, as an option the content source entity could send the protected document to a specified printer entity over a secure channel such as an SSL channel, in order to include an additional layer of security. Further, the encrypted job ticket and encrypted document are encapsulated in a MIME package. MIME packages are known in standard wc3, as will be known by those skilled in the art. The MIME standard allows for a combination of documents, but does not apply any encryption within the MIME standard. MIME packaging is carried out at the policy editor entity. A third party misappropriating the MIME package, can separate the encrypted job ticket from the encrypted content document, but would be unable to decrypt the job ticket or the content document.

Figure 5:
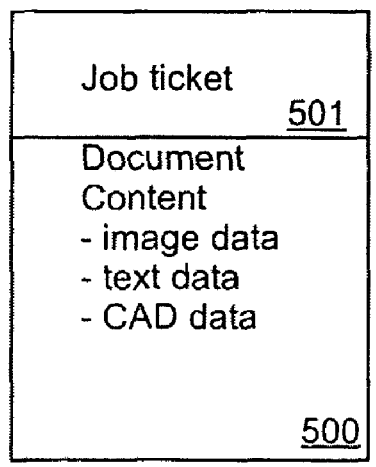
FIG. 5 illustrates schematically elements of the protected document of FIG. 4.

Referring to FIG. 5 herein, there is illustrated schematically an architecture of one example of a protected document. The protected document comprises a content data 500 comprising a document to be printed, and a job ticket 501. The content data 500 contains any type of printable content, including image data, text data, CAD data, or data for other applications packages such as Corel Draw®, and can be presented in a variety of formats including JPEG, PDF, or TIFF. Types of content can include artwork, text photographs, or any other type of data which is printable in two-dimensional format.

The job ticket data 501 may be provided in the known job definition format (JDF). The job ticket contains information types from a set including:

information about an author of the content data;
data describing a type of file policy; and
policy information specifying policies applicable for printing of the file.

The document job ticket contains the job ticket itself, the author data, and policy rules. This job ticket and policy has to be described in a way which is extensible and allows for the inclusion of any rule. This can be accomplished by extending the industry standard job definition file (JDF) to include a policy specification section in XML. The document and the data can be bound together using a MIME multipart encoding.

The document is signed and encrypted by the policy editor.

In various implementations, the document is signed and encrypted by the policy editor, or alternatively by the author. Both options are equally valid, as long as the authors or the policy editors public keys are known by the policy enforcement authority. Publishing the public keys in a public key directory may allow the policy enforcement authority to have knowledge of the public keys of the author and/or policy editor.

In an alternative implementation, the job ticket data 501 may contain a pointer to a policy editor service, including an electronic address of that service. Instead of containing instructions and conditions for printing of a document in the job ticket itself, a content owner may vary instructions for handling of documents centrally with a policy editor application, and upon reaching a printer facility, a protected document file may cause the printer document to refer via the policy enforcement authority back to the policy editor entity to obtain the latest set of instructions, applying to that particular document for printing that document. In this way, a content owner can centrally set policies applicable to all documents of a specified type, as an alternative to embedding the policy data in the protected document itself. Consequently, for documents which were created some time ago, for example one year ago by a content owner, and the content owner wishes to change the set of permissions applicable to the printing of those documents, where the documents are still stored at print facilities, this is possible, using a job ticket which refers back to a policy editor application for downloading of the latest set of policy rules for printing that document.

Figure 6:
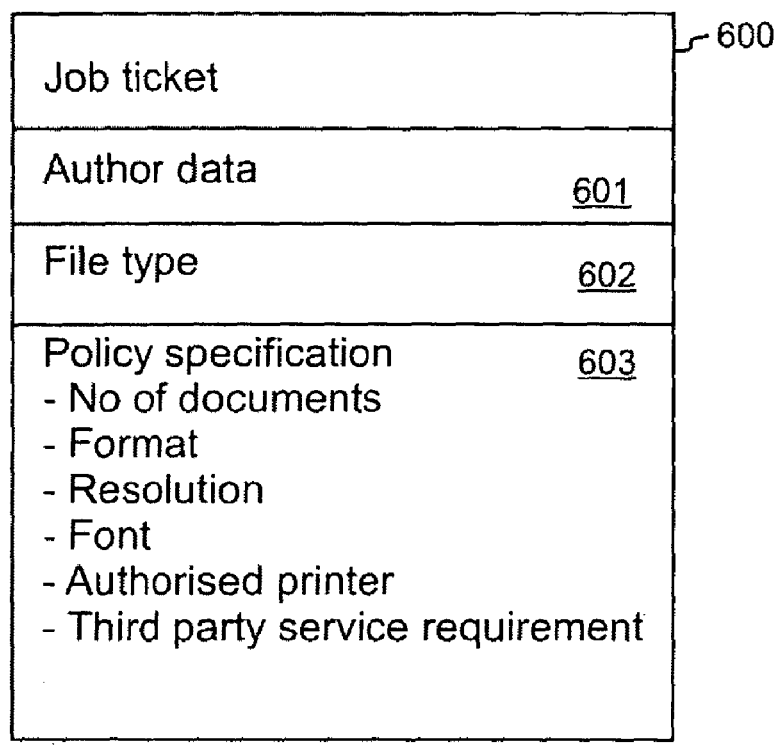
FIG. 6 illustrates schematically data fields and components of a job description file portion of the protected document of FIG. 4.

Referring to FIG. 6 herein, there is illustrated schematically data fields present within a job ticket portion of a protected document file. Job ticket portion 600 comprises an author data fields 601 containing data describing an author of a document content data; a file type field 602 containing data describing a file type comprising the content data, for example PDF, JPEG, TIFF, or a particular type of data suitable for an application; and policy data 603 specifying permissions for printing of the document, the policy information at field 603 including fields for a number of documents authorised to be printed, a format of the documents to be printed, the resolution of the printing; fonts applicable to the printed document; data describing an authorised printer device or authorised person for printing; data field for specifying a third party service requirement for example an e-commerce service, for applying any pre-processing to the content data, prior to printing. The third party service requirement field may comprise the e-mail address, digital signature and other details of a third party e-service, for which parts of the image may be sent for pre-processing prior to printing.

Figure 7:
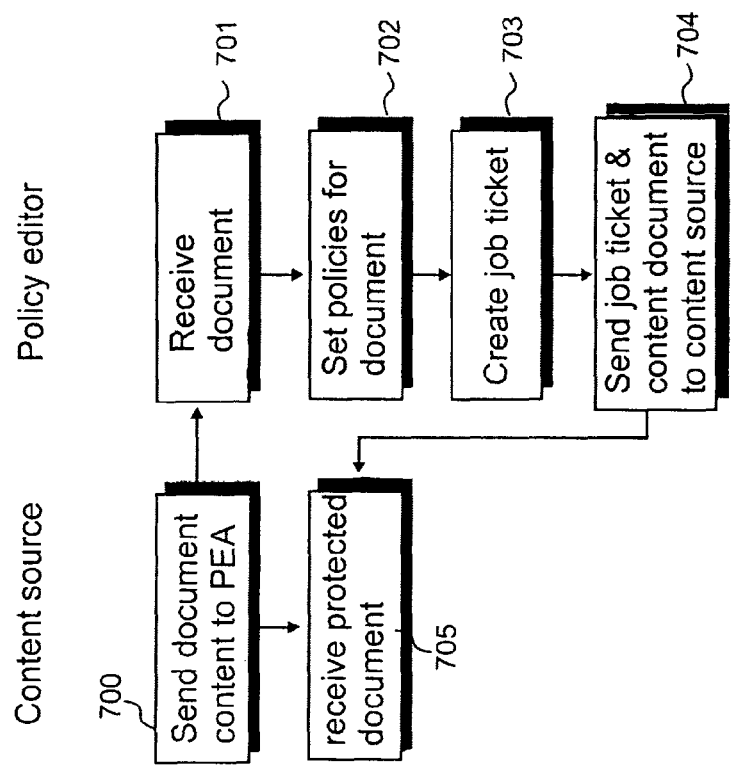
FIG. 7 illustrates schematically operation of the document management system of FIG. 2 for generation of a protected document file.

Referring to FIG. 7 herein, there will now be described a workflow involved in processing a document to result in a printed document 705. A content owner uploads 700 a document content data to the policy editor application, which is received by the policy editor application 701. Using a user interface generated by the policy editor, the content owner sets 702 a set of policies which are to be enforced for that particular document. A content owner accesses a web-server interface, which displays various options for protection of the document, and for setting policies which can apply to printing of the document. The user selects the required options from the policy editor application to apply to that particular document, and the policy editor application creates 703 a job ticket file to attach to that document. Communication between the content owner and the policy editor is secure, for example using a secure socket layer protocol. A job description file (job ticket) is created by the policy editor application and the document and job ticket are sent 704 to the content source which receives the protected document 705. The policy editor application creates a protected package containing the document and the job description file (job ticket). The protected package is protected by encryption applied by the policy editor. The policy editor has a private key and a public key. The private key is known only by the policy editor. The public key is known by the policy enforcement entity. The policy editor encrypts the document itself using a symmetric key based algorithm, such as DES or Blowfish. The key is stored in the job ticket. The Job ticket, which is smaller is encrypted using an asymmetric scheme, and using the public key of the policy enforcement authority, which is stored by the policy editor, so that only the policy enforcement authority can decrypt the job ticket, and hence obtain the key for decryption of the document as a whole. The policy editor combines the job ticket and the encrypted content document using MIME encoding, and sends the complete package back to the content owner.

The content owner receives a protected document back from the policy editor application. The content owner can store the protected document locally on their own hard disk drive of their local source computer. The content owner can then send the policy document to one or more destination printer devices by conventional means, such as e-mail or the like. The policy document may be stored in protected PDF format for example. The protected document package is sent to the printer in MIME encoded format.

The printer has a pair of its own keys, being a public printer key and a private printer key. The policy enforcement authority stores the public key of the printer, and has a list of public keys for each of the printers registered with the system, and data identifying each printer. Each printer also stores the policy enforcement authority public key. The printer receives the MIME encoded protected document package, and can separate the encrypted job ticket from the encrypted content document without having to decrypt them at this stage. The printer device sends the job ticket to the policy enforcement authority to obtain the policy data and the decryption key for decrypting the content document. The key for decrypting the content document, the name of the symmetric algorithm used for encrypting the content document, and the policy data are included in a new job description file, and sent from the policy enforcement authority to the printer over a secure channel such as SSL. The printer, which stores the public key of the policy enforcement authority, can decrypt the job description file and obtain the key and algorithm type for decoding the content document. Communications between the printer and the policy enforcement authority are done using their private keys to sign the messages between them.

Once created, the protected document file can only be printed by printer devices which are within the system, that is by devices which are pre-registered with a policy enforcement application operated by one or more policy enforcement authorities.

The policy enforcement authority stores a list of authorized printers which are pre-registered with the policy enforcement authority and which are authorized for printing out protected documents, together with their public keys. The policy enforcement application also electronically signs the protected document by adding a digital signature resulting in a protected document file.

Figure 8:
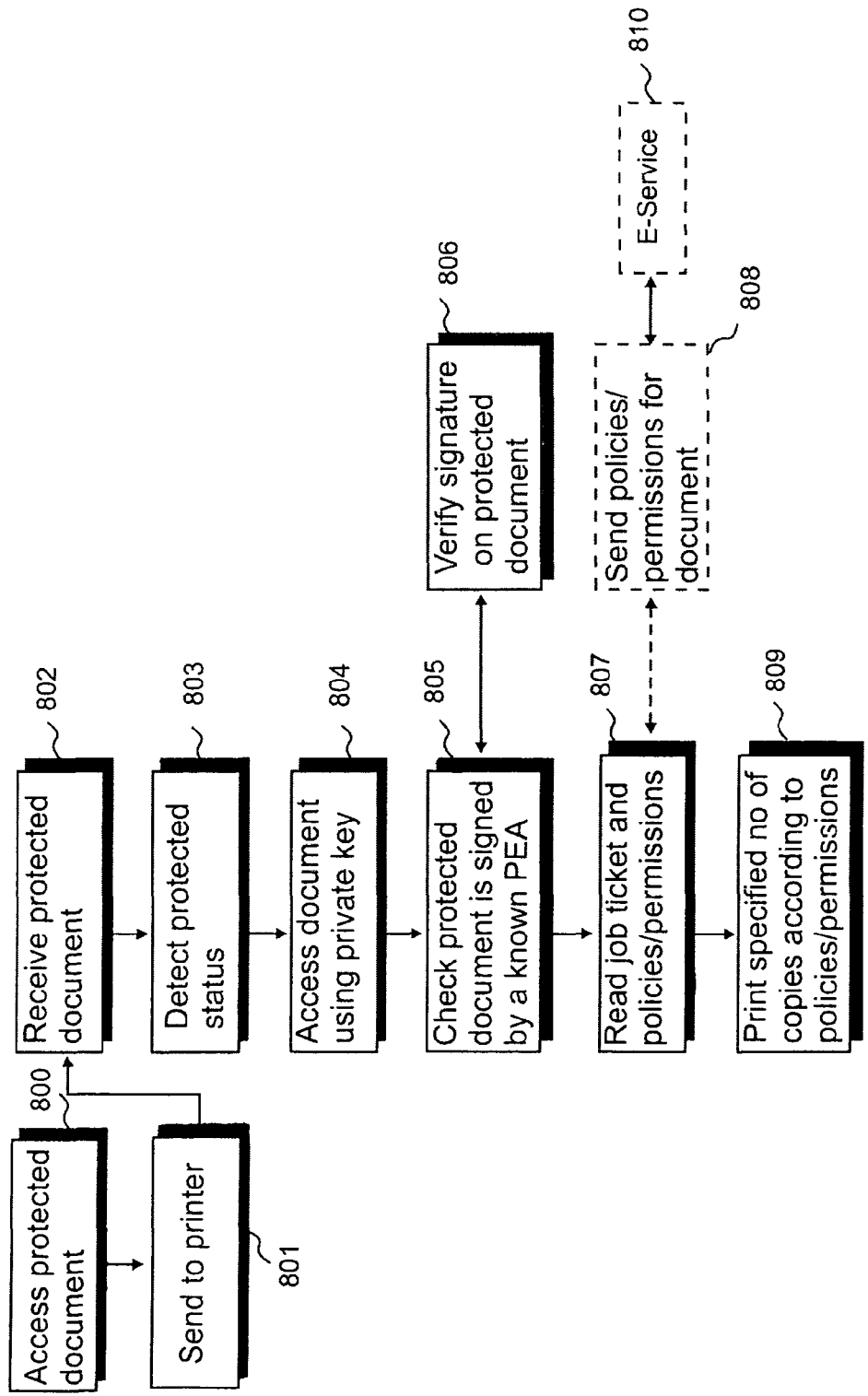
FIG. 8 illustrates schematically operation of the document management system for printing one or a plurality of print documents according to a received protected document.

Referring to FIG. 8 herein there is illustrated schematically process steps carried out by the system components for printing of a protected document. A receiver of a protected document may attempt to access the protected document 800 using their local computer, in which case the encryption protects the document and access will be denied. The receiver then sends 801 the document to their local printer, which is enabled for verification and printing of the protected document. The printer device having received the protected document 802, detects 803 that the protected document is of a protected status, and decrypts the document using the private key of the printer device in step 804. The printer also checks that the received protected document has been signed by a policy enforcement application operated by a policy enforcement authority for which the printer has stored details of in step 805. This can be achieved by reading a digital signature contained in the job ticket, and verifying that with a policy enforcement application in step 806. The policy enforcement application receives the digital signature, and verifies 806 that the digital signature belongs to a policy enforcement authority operating that policy enforcement application.

Having decrypted and verified the protected document, the printer then reads the job description file, which contains the policies and permissions for printing a print job in step 807. Permissions and policies may be contained within the job description file of the protected document. Additionally, and/or alternatively, the job description file may point to a policy enforcement application, which has a predetermined stored set of permissions and policies for that particular protected document or protected document type, which it has received from a policy editor application previously. The printer takes its instructions from the permissions and policies in the job description file and/or received from the policy enforcement application 808 for that particular type of document, and in step 809 prints a print job according to the permissions and policies contained within the job description file. Some of the policies may be as complicated as requiring the access of the printer device to a third party service 810, for example an e-commerce application, for example for embedding a further document type, providing a rendering service or the like. Provision of this service can be handled through the policy enforcement application, which obtains the necessary service from a remote service provider 810 and relays the processed service back to the printer device. The printer device may then incorporate the service (e.g. embedded image, rendered image etc.) into the print job.

In process 809, the printer device fulfills the print job by printing a number of documents as specified in the permissions of the job description file, in a format specified in the job description file.

The printer devices can be made to be very limited in the places to which they refer to for verification of print instructions, so that the printer always refer to a policy enforcement application, whenever a printing job is to be carried out. A communications link between the policy enforcement application and one or more policy editor applications is secure, and each policy editor application can be verified with a policy enforcement application. Therefore, in a chain of communication, on receiving a document a printer device may revert to a policy enforcement application over a secure link. The policy enforcement application then refers to a policy editor application over a further secure link, to verify that a print job can be carried, before sending permission back to the printer in order to print the job.

Figure 9:
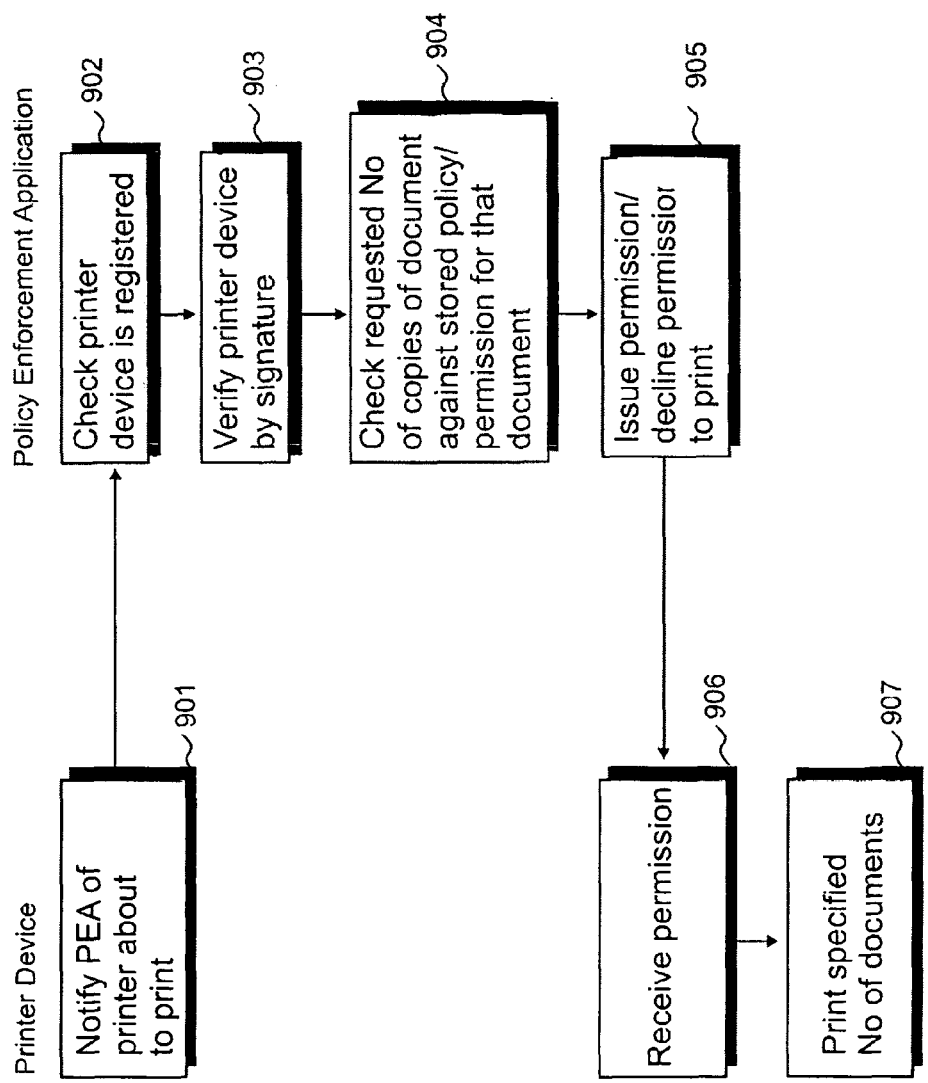
FIG. 9 illustrates schematically operation of the document management system, for obtaining authorisation to print a predetermined number of copies, where the authorisation is received from a policy enforcement authority.

Referring to FIG. 9, herein, an example of a policy may be to limit the number of prints carried out by a printer device for a certain protected document. In this case, the printer device will access the policy enforcement application, notifying 901 the policy enforcement application that it is about to print the document. The policy enforcement application, will annotate that document and will give or not give permission to the device in order to print a predetermined number of copies. The policy enforcement application checks 902 that the printer device is registered with that policy enforcement authority by verifying a digital signature of the printer device in step 903. The policy enforcement application reads a requested number of document prints received from the printer device, and checks 904 whether the stored data allows printing of that number of documents. For example, the content order may set via the policy editor application, a predetermined number of copies of a document which can be printed. That predetermined number is stored by the policy enforcement application, and when the policy enforcement application receives a request to print that number of documents, provided the number of prints requested is within the predetermined number, the policy enforcement application will give permission 905 to print that number of documents. However, if the requested number of prints exceeds the predetermined authorized number, then the policy enforcement application will deny access to print that number of documents. The policy enforcement application may give permission for a different number of documents for which permission is authorized to be printed, and send this information back to the printer device, or may authorize the whole requested number of prints as appropriate.

Once the printer has received permission 906, in step 907 the printer prints the specified number of documents set out having received permission from the policy enforcement application. Where the policy enforcement application denies any permission to print any documents then the printer does not print any documents.

Figure 10:
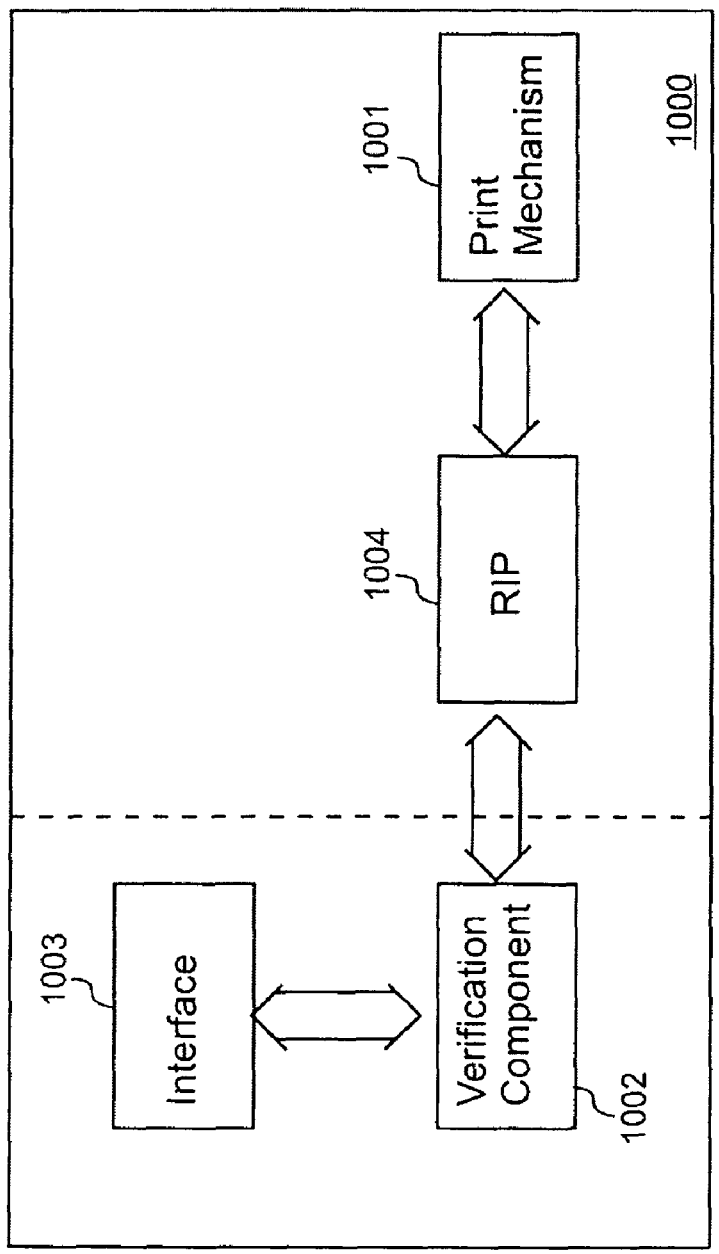
FIG. 10 illustrates schematically a printer device having a verification component for communication with a policy enforcement application, according to a specific embodiment of the present invention.

Referring to FIG. 10 herein, there is illustrated schematically a printer device according to a third specific implementation of the present invention, enabled for printing protected documents in the system of FIG. 2. The printer device 1000 comprises a print mechanism 1001, a verification component 1002, and an interface 1003 for communication with a policy enforcement application. The printer device may comprise a raster image processor 1004. The verification component 1002 comprises a firmware component, which can be either incorporated into a conventional printer device as a software upgrade, or which can be provided as a separate card containing an application specific integrated circuit (ASIC).

In the specific implementations disclosed above, print management systems allow content owners to make documents publicly available, for example on the internet, but to keep control of how those documents are printed. The controls may include how many copies are printed, by whom the copies are printed, and specified copy resolution, format, size and other parameters for which permission may be granted. An internet application may be used by a content owner to produce a protected document, which is an encrypted document combined with a job ticket, where the job ticket includes information about the document author, the file type and printing controls and permissions. The protected document may be printed by selected printers only, each having an embedded service, which request authentication from a policy enforcement authority. The policy enforcement authority may operate a further internet application i.e. a policy enforcement application, when receiving a protected document to print.

The system relies upon public key encryption to ensure that protected document may be printed in a manner approved by the system. The system avoids the need for an application stored at the clients side because a protected document is provided by a policy editor application running as a service and available over a communications network to a user or content owner, and therefore has an advantage over prior art systems which do require an application stored at the clients side. Unlike prior art systems, control of a document is not lost prior to printing.

Figure 11:
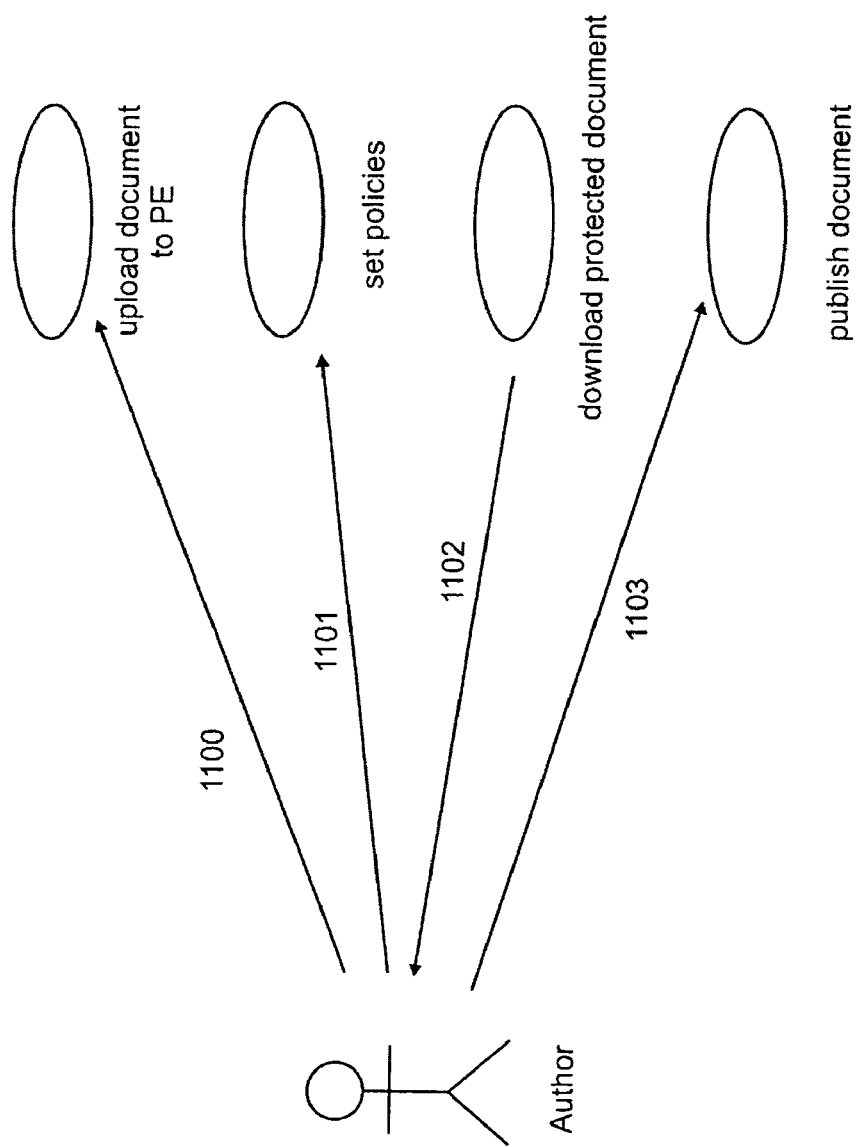
FIG. 11 illustrates schematically an example of usage of a policy edit or application by a user for obtaining a protected document.

Referring to FIG. 11 herein, there is illustrated schematically an example of use of the policy editor application.

The user uploads a document to the policy editor application in step 1100. Using a web interface, the user sets policies determining the usage of the document and these are applied to the document 1101 at the policy editor application. The user downloads the protected document from the policy editor using the web interface. The user receives 1102 a protected document. The user publishes the document 1103, by sending the document to one or more recipients.

Figure 12:
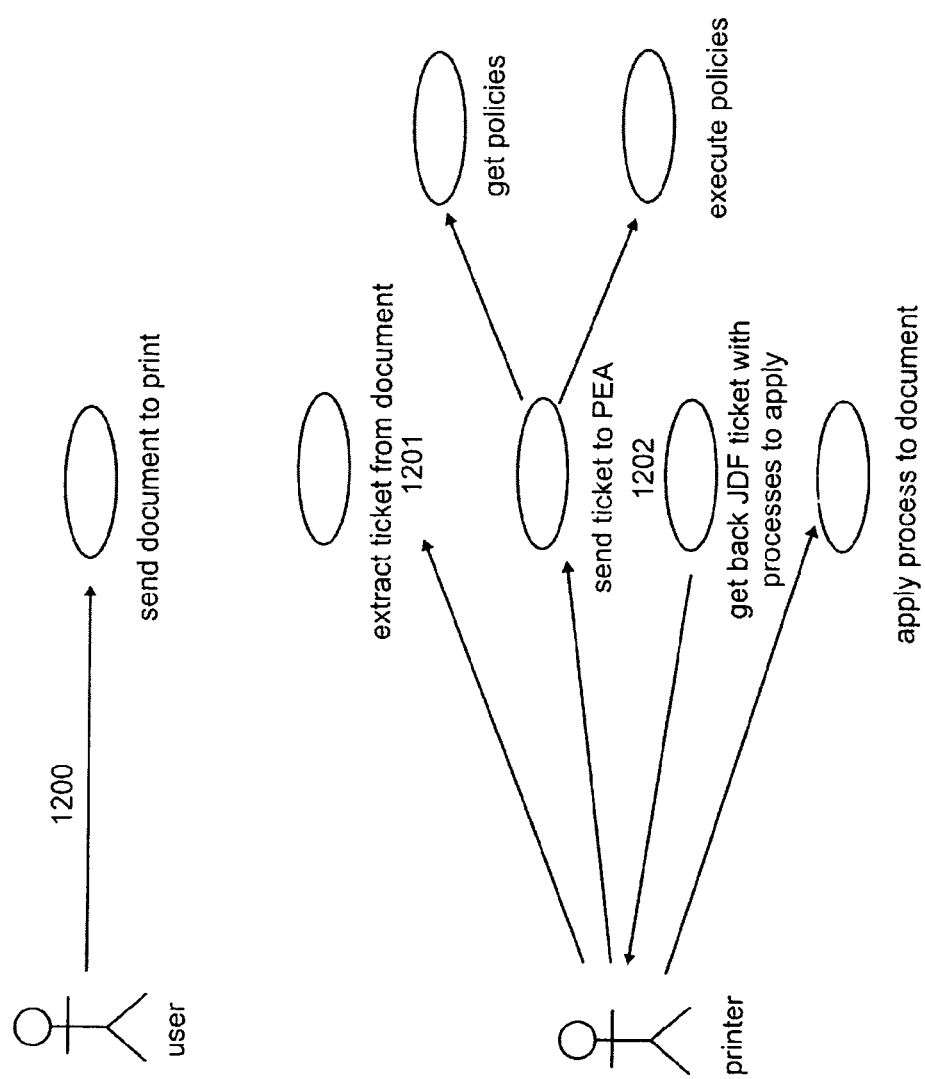
FIG. 12 illustrates schematically an example of a user sending a protected document to a secure printer for printing.

Referring to FIG. 12 herein, there is illustrated schematically usage of the system for printing of documents. A user sends the document to print in step 1200 by sending the document to a printer.

The printer device extracts the job ticket from the received document MIME package in process 1201. The job ticket contains the policies. The printer device sends the job ticket containing the policies, to the policy enforcement authority in process 1202. The policy enforcement authority receives the job ticket, and from the received job ticket generates a job definition format ticket describing the appropriate processors that the printer will execute, according to the polices contained in the job definition format tickets. There are two further possibilities for:

The policy enforcement authority may contact the policy editor to obtain policies which are not specified in the ticket but which are referred to in the ticket. This forces the policy enforcement authority to check for the policies in the policy editor in order to generate the job definition format ticket.

Secondly, where the job ticket contains a job definition format ticket which itself contains the policies, the policy enforcement authority may need to execute some action, such as sending an e-mail to an author, as specified in the policy data. In this case, since the polices are contained in the job tickets received by the policy enforcement authority, the policy enforcement authority can proceed to apply those policies in the creation of a job definition format ticket.

The policy enforcement authority sends the job definition format ticket to the printer, with a set of processes to execute on the document. Examples of such processes include decryption of a document; printing a copy of the document; setting a resolution to a specified number of dots per inch, for example 300 DPI, printing a watermark; and destroying an electronically stored document at the printer.

The printer executes the set of processes specified in the job definition format ticket, in the order specified in the job definition format ticket. Usually, the last process specified involves actual printing of the document.

Figure 13:
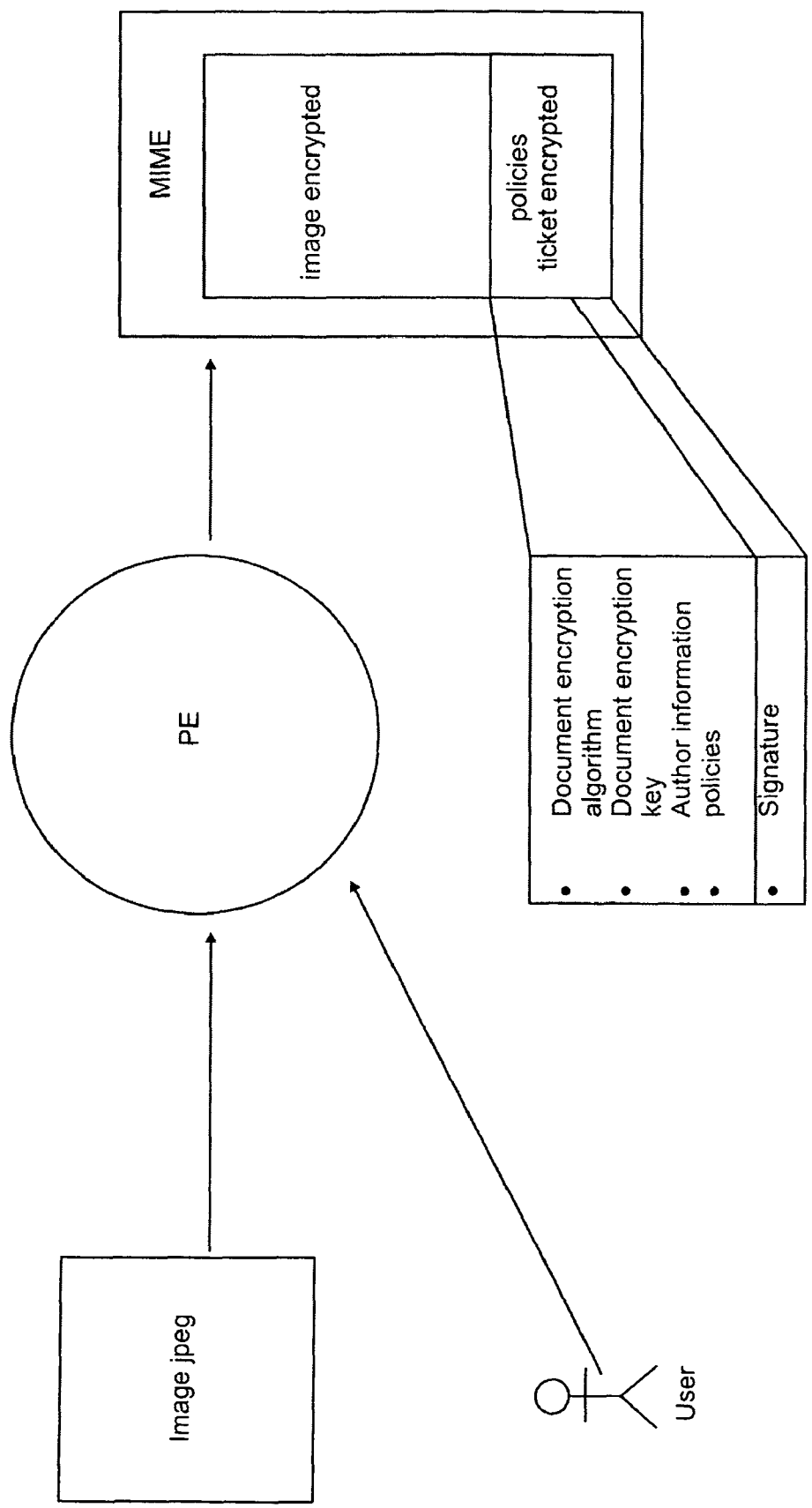
FIG. 13 illustrates schematically steps carried out by a secure printer device for processing a received secure document and applying enforcement of document handling policies to the document.

Referring to FIG. 13 herein, there is illustrated schematically processing of a document during the stages of a user uploading a document to a policy editor, a user setting the policies using a web interface, and the user downloading a protected document including the policies.

The protected document comprises a MIME multipart package including:

the document encrypted using a symmetric key algorithm, for example 3DES, blowfish, or the like: and a ticket which contains a set of user policies.

The ticket itself is encrypted using the policy enforcement authority's public key and is signed using the policy editor and/or a users private key. This ensures that firstly, only the policy enforcement application can decrypt the ticket, and secondly, that it can be verified that the document has issued from the user.

The ticket comprises a XML document which contains:

1. A key and algorithm name used for the encryption of the document.

2. Information about the author of the document

3. Descriptions of the policies to apply to the document.

The polices themselves comprise an XML document which contains:

1. A name of the policy, or a URL where the policy is defined. In the latter case, the URL is in the policy editor.

2. Data describing when to apply the policy

3. Data describing action to take if the policy is to be executed

4. Data describing action to take if the policy can be executed.

As will be understood by the person skilled in the art, the above described entities can be implemented as discrete purpose built entities using for example application specific integrated circuit (ASIC) technology, or as one or more general purpose computer platforms controlled by computer program instructions for causing the one or more such computer platforms to carry out the functions and processes as described above. Such computer program instructions may be delivered to or included in the computer platforms in the form of digital data supplied on a data storage carrier or media, for example a CD ROM, tape storage device or the like, or may be input to a hard disk drive of a computer platform via a communications port of the computer, in the form of electronic digital carrier signals or optical digital carrier signals.

One specific embodiment of the invention comprises a computer program comprising instructions for secure management of content data, said instructions operable for causing at least one computer entity to: apply a job description data to said content data, said job description data identifying a set of printing criteria for printing said content data; apply a verification data to said content data, said verification data verifying a source of said printing criteria; encrypt said content data and said printing criteria data produce an encrypted protected document; receive said encrypted protected document at a printer device; said instructions further operable for: causing said printer device to decrypt said protected document using a locally stored key data; causing said printer device to read said verification data and send said verification data to a policy enforcement device; causing said printer to read said printing criteria; causing said printer to verify a source of said protected document with said policy enforcement entity; and causing said printer to print a said document in compliance with said document printing criteria.

Another specific embodiment of the invention comprises a computer program comprising program instructions for secure management of content data, said instructions being operable for causing at least one computer entity to: apply a job description data to said content data, said job description data identifying a set of printing criteria for printing said content data; apply a verification data to said content data, said verification data verifying a source of said printing criteria; and encrypt said data content and said job description data.

A further specific embodiment of the present invention comprises a computer program comprising program instructions for operating a policy enforcement entity, said policy enforcement entity comprising a policy enforcement component, said instructions operable for causing said policy enforcement entity to: receive a document file over a secure communications link; receive data identifying a source of said document files; receive data identifying a set of policies for printing of at least one document from said document file; in response to a received request for verification of a document, compare said verification request with said received document file; and confirm said set of policies for printing of at least one document from said document file.

A further specific embodiment according to the present invention includes a computer program comprising program instructions for applying a policy data to a document file, said instructions operable for causing at least one computer entity to: receive a document file containing a content data; create a job description file, said job description file containing a set of conditions applicable to said document file; and encrypt said job description file and said document file.

The invention claimed is:

1. A print management system for production of printed documents, said system comprising:
   one or more processors;
   a policy editor component comprising instructions executable on at least one of the one or more processors to receive a document file, and apply a level of protection to said document file to produce a protected document file;
   a policy enforcement component comprising instructions executable on at least one of the one or more processors to enforce a document management policy for said protected document file; and
   at least one printer device discrete from said policy editor and policy enforcement components and configured to receive said protected document file, refer to said policy enforcement component, and in response to an authorization signal received from said policy enforcement component, to print at least one printed document,
   wherein said printer device is configured to:
      decrypt said received protected document file;
      read a set of instructions specifying conditions which are to be applied to said document file; and
      apply said specified conditions to said document file.

2. A print management system for production of printed documents, said system comprising:
   one or more processors;
   a policy editor component comprising instructions executable on at least one of the one or more processors to receive a document file, and apply a level of protection to said document file to produce a protected document file;
   a policy enforcement component comprising instructions executable on at least one of the one or more processors to enforce a document management policy for said protected document file; and
   at least one printer device discrete from said policy editor and policy enforcement components and configured to receive said protected document file, refer to said policy enforcement component, and in response to an authorization signal received from said policy enforcement component, to print at least one printed document,
   wherein said printer device is configured to:
      decrypt said received protected document file; and
      read a set of instructions specifying conditions for printing of said document file.

3. A print management system for production of printed documents, said system comprising:
   one or more processors;
   a policy editor component comprising instructions executable on the one or more processors to receive a document file, and apply a level of protection to said document file to produce a protected document file;
   a policy enforcement component comprising a server computer to enforce a document management policy for said protected document file; and
   at least one printer device discrete from said policy editor and policy enforcement components and configured to receive said protected document file, refer to said policy enforcement component, and in response to an authorization signal received from said policy enforcement component, to print at least one printed document,
   wherein said server computer of the policy enforcement component is configured to:
      receive and store data containing instructions specifying a condition to be applied to said document file;
      receive a request from said printer device, for printing a document according to said condition; and
      send a signal to said printer device, authorizing printing of said document file according to said condition.

4. A system for management of rights in digital data, said system comprising:
   one or more processors;
   a policy creation entity comprising instructions executable on the one or more processors to apply a document management policy to at least one document, said policy comprising conditions on usage of said document;

a policy enforcement entity comprising a server computer for enforcement of said document management policy applied to said document; and a document printing facility discrete from said policy creation and policy enforcement entities and configured for printing documents in compliance with said document management policy as enforced by said policy enforcement entity, wherein said server computer of said policy enforcement entity is to:

receive a document file from said policy creation entity;

apply a digital signature to said received document; and store data describing a source of said document.

5. A system for management of rights in digital data, said system comprising:

one or more processors;

a policy creation entity comprising instructions executable on at least one of the one or more processors to apply a document management policy to at least one document, said policy comprising conditions on usage of said document;

a policy enforcement entity comprising instructions executable on at least one of the one or more processors to enforce said document management policy applied to said document; and a document printing facility discrete from said policy creation and policy enforcement entities and configured for printing documents in compliance with said document management policy as enforced by said policy enforcement entity, wherein said document printing facility comprises:

a printer device having a printer mechanism and a verification component, said printer device configured to:

receive said document in protected form;

apply a decryption algorithm to said received protected document;

read a job ticket component of said received protected document in order to determine conditions applying to printing of said protected document;

read a digital signature of said protected document;

communicate with said policy enforcement entity for verifying a source of said protected document; and print said received protected document according to a set of conditions specified in said job ticket.

* * * * *